United States Patent
Brunschwiler et al.

(10) Patent No.: US 9,821,418 B2
(45) Date of Patent: Nov. 21, 2017

(54) ADSORPTION HEAT EXCHANGER DEVICES

(75) Inventors: Thomas J. Brunschwiler, Thalwil (CH); Javier V. Goicochea, Rueschlikon (CH); Bruno Michel, Zurich (CH); Patrick Ruch, Jenins (CH)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 14/128,822

(22) PCT Filed: Jun. 8, 2012

(86) PCT No.: PCT/IB2012/052901
§ 371 (c)(1),
(2), (4) Date: Apr. 15, 2014

(87) PCT Pub. No.: WO2013/001391
PCT Pub. Date: Jan. 3, 2013

(65) Prior Publication Data
US 2014/0238071 A1    Aug. 28, 2014

(30) Foreign Application Priority Data
Jun. 30, 2011 (EP) .................................. 11172086

(51) Int. Cl.
*B21D 53/02* (2006.01)
*B23P 15/26* (2006.01)
(Continued)

(52) U.S. Cl.
CPC ........... *B23P 15/26* (2013.01); *B01J 20/2803* (2013.01); *B01J 20/3042* (2013.01); *F25B 15/00* (2013.01); *F25B 35/04* (2013.01); *Y10T 29/4935* (2015.01)

(58) Field of Classification Search
CPC . B23P 15/26; F25B 15/00; F25B 35/04; B01J 20/3042; B01J 20/2803;
(Continued)

(56) References Cited

U.S. PATENT DOCUMENTS 3,838,673 A * 10/1974 Csicsery ................. F02M 1/16
                                                                      123/179.14
5,388,637 A *  2/1995 Jones ..................... F25B 35/04
                                                                      165/104.12
(Continued)

FOREIGN PATENT DOCUMENTS

| | | |
|---|---|---|
| DE | 19539106 A1 | 4/1997 |
| JP | 10185348 A * | 7/1998 |
| JP | 2000018767 | 1/2000 |

OTHER PUBLICATIONS

Bolitin et al., "The shrinkage of Epoxy Bonding Agents in the Curing Process", Oct. 18, 1972, Royal Aircraft Establishment, Library Translation No. 1686.*

(Continued)

*Primary Examiner* — Jun Yoo
(74) *Attorney, Agent, or Firm* — Cahn & Samuels, LLP

(57) ABSTRACT

Adsorption heat exchanger devices (11, 25) are provided for use in solid sorption refrigeration systems (1) together with methods for making such devices and adsorbent structures therefor. The methods include applying a curable binder, in solution in a solvent, to granular adsorbent material, and then evaporating the solvent and curing the binder. The curable binder solution is sufficiently dilute that, during evaporation of the solvent, the binder becomes concentrated around contact points between granules (18) of the adsorbent material whereby localized bonds (19) are formed around the contact points on curing of the binder.

18 Claims, 5 Drawing Sheets

(51) Int. Cl.
*B01J 20/28* (2006.01)
*B01J 20/30* (2006.01)
*F25B 35/04* (2006.01)
*F25B 15/00* (2006.01)

(58) Field of Classification Search
CPC ..... B01J 20/10–20/205; B01J 20/286–20/292; Y10T 29/4935; B01D 15/08; B01D 15/00
See application file for complete search history.

(56) References Cited

U.S. PATENT DOCUMENTS

| | | |
|---|---|---|
| 7,875,738 B2 | 1/2011 | Betz |
| 2003/0114350 A1* | 6/2003 | Schmitt ................ B01J 20/183 510/466 |
| 2006/0166819 A1 | 7/2006 | Powers et al. |
| 2009/0217526 A1 | 9/2009 | Mittelbach |
| 2010/0011768 A1* | 1/2010 | Hacsi ..................... F03G 7/00 60/721 |
| 2012/0183755 A1* | 7/2012 | Jaworowski ........ B05D 3/0254 428/213 |

OTHER PUBLICATIONS

List of IBM Patents or Applications Treated as Related, pp. 1-2.
English translation of JP 2000018767, pp. 1-6.

* cited by examiner

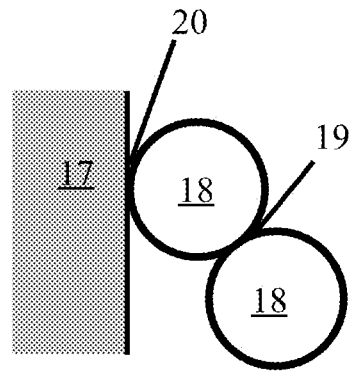
Figure 4
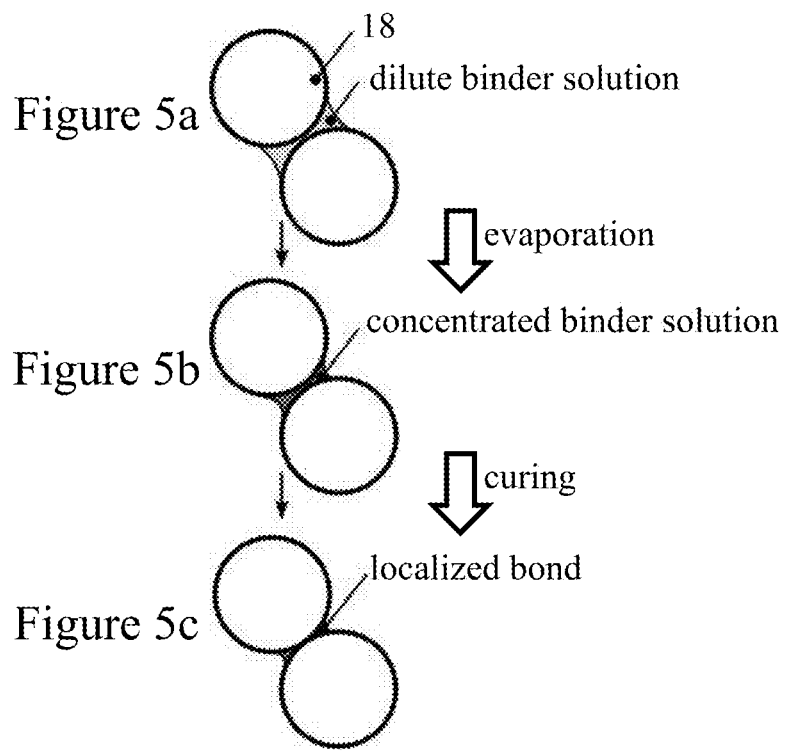
Figure 5a
Figure 5b
Figure 5c

ADSORPTION HEAT EXCHANGER DEVICES

CROSS-REFERENCE TO RELATED APPLICATIONS

This application claims priority under 35 U.S.C. §371 from PCT Application, PCT/IB2012/052901, filed on Jun. 8, 2012, which claims priority from European Patent Application No. 11172086.8 filed on Jun. 30, 2011, the entire contents of both applications are incorporated herein by reference.

This invention relates generally to adsorption heat exchanger devices for use in solid sorption refrigeration systems. Adsorption heat exchanger devices are provided, together with methods for making such devices and adsorbent structures therefor.

Solid sorption refrigeration systems are driven by the adsorption and desorption of a refrigerant vapor (the adsorbate) by a solid substance (the adsorbent) which is usually highly porous. In contrast to conventional vapor-compression cooling systems which are driven by a mechanical compressor, no electrical energy is needed to drive the refrigeration cycle. The basic cycle involves an adsorption phase and a desorption phase. In the adsorption phase, the refrigerant vapor is adsorbed by the adsorbent substance resulting in release of heat. In the desorption phase, heat is applied to the adsorbent causing desorption of the refrigerant. The heat transferred during these processes is conveyed by a heat exchanger between the adsorbent and a heat transfer fluid (e.g. water or a water-glycol mixture) or an external environment. The adsorption and desorption processes occur in conjunction with evaporation and condensation of refrigerant in an evaporator/condenser. The adsorption of the gaseous refrigerant lowers the vapor pressure, promoting evaporation of the liquid refrigerant in the evaporator. During this evaporation, heat is extracted from an environment to be cooled, resulting in refrigeration. By supplying heat to the adsorbent via the heat exchanger, the adsorbed refrigerant is released into the vapor phase, thus regenerating the adsorbent material for the next adsorption cycle. The now gaseous adsorbate passes to a condenser where heat rejection to the environment takes place. As in conventional vapor-compression cooling, the liquid refrigerant is passed through a control device (e.g. an expansion valve) back into the evaporator, and the cycle can then be repeated.

The refrigeration cycle is driven entirely by heat input during the desorption phase without further input of mechanical work. Solid sorption cooling may therefore be preferred over conventional vapor-compression cooling where excess heat is readily available, e.g. from the sun (solar cooling) or as waste heat from other sources such as power dissipation in datacenters. Another advantage is that the usual refrigerants, such as water and methanol, used in solid sorption cooling are environmentally friendly and make a negligible contribution to global warming, unlike the fluorocarbon refrigerants typically used in vapor-compression cooling.

Despite the advantages, the cooling power of solid sorption cooling systems is very low compared to vapor compression cooling systems of the same size. The low specific cooling power is due, in part, to the poor heat transfer characteristics of the adsorbent material. In first-generation systems, the adsorber units used beds of loose adsorbent grains lying on the metal heat exchanger surface. Recent efforts to improve thermal conductivity of adsorbents include the use of monolithic adsorbents instead of granular adsorbent material and use of adsorbent materials with high thermal conductivity. Consolidated adsorbent materials have been formed of graphite, metallic foams, or adsorbent grains bound in a matrix such as resin. Composite adsorbent materials have also been produced from a mixture of adsorbent particles and particles with higher thermal conductivity. These consolidated materials generally suffer from poor permeability to the adsorbate vapor whereby flow of adsorbate within the structure is significantly hindered. Due to long diffusion paths to adsorption sites in granular or consolidated adsorbents, the vapor pressure near the inner adsorbent surface is slow to adapt to variations in the system pressure, thereby limiting the rate of cooling and regeneration of the adsorbent. More recently, heat transfer at the thermal interface between the heat exchanger and adsorbent material has been improved by coating the heat exchanger fins or tubes with thin-film adsorbent coatings formed by adsorbent material dispersed in a suitable matrix or by direct synthesis of the adsorbent, usually a type of zeolite, on the external heat exchanger surface.

US Patent Application Publication No. 2009/0217526A1 discloses an adsorption heat exchanger produced by applying an adhesive layer to a heat exchanger surface. After filling with granular adsorbent and application of heat, the adsorbent particles directly adjacent the heat exchanger are partially embedded in the adhesive. The remaining, unglued particles can then be removed to leave an adsorbent coating.

US Patent Application Publication No. 2006/0166819A1 discloses resin-bonded adsorbent materials for use as moulding compositions. U.S. Pat. No. 7,875,738 discloses consolidated compositions of particulate adsorbent material in a matrix of amorphous non-glassy ceramic material. Such a composition may be formed in a pipette tip by introducing a dispersion of binder polymers and particulate adsorbent in a solvent and then curing this dispersion to form the adsorbent mass.

Japanese Patent Application Publication No. 2000018767A discloses adhesion of adsorbent particles to a heat exchanger and to each other via a dispersion of thermosetting or thermoplastic adhesive powder to form randomly distributed point-like adhesive contacts.

One embodiment of an aspect of the present invention provides a method for making an adsorbent structure for an adsorption heat exchanger device. The method comprises:

applying a curable binder, in solution in a solvent, to granular adsorbent material;

evaporating the solvent; and curing the binder;

wherein the curable binder solution is sufficiently dilute that, during evaporation of the solvent, the binder becomes concentrated around contact points between granules of the adsorbent material whereby localized bonds are formed around the contact points on curing of the binder.

Methods embodying this invention are predicated on the realization that application of a highly-dilute solution of curable binder to granular adsorbent material enables production of especially efficient adsorbent structures for adsorption heat exchanger devices. In particular, if the curable binder solution is sufficiently dilute, stabilization of the concave meniscus of the solvent by surface tension will cause the binder to be concentrated near contact points between adsorbent granules during evaporation of the solvent. Thus, not only is the binder prevented from coating the entire granule surface (which would act as a barrier toward mass transfer during adsorption and desorption), but on curing of the binder, the granules are bound together via bonds which are localized around the contact points between granules. Efficient bonding can therefore be achieved via localized bonds which do not substantially impair mass transport through the adsorption/desorption structure. Moreover, the localized bonds effectively expand the thermal interfaces between granules offering improved thermal transport in the bonded structure. Since heat transfer through the vapor phase is very low due to the low pressure employed in solid sorption refrigeration devices, usually below $10^4$ Pa, an enlargement of the contact area between adjacent granules is very effective in improving the thermal conductivity of the adsorption structure. Overall, therefore, methods embodying the invention may provide for exceptionally efficient adsorbent structures for adsorption heat exchanger devices.

The curable binder used in embodiments of the invention may comprise an adhesive, or may comprise a fibrous or other substance which can undergo some form of curing process to cause the binder to harden or solidify or otherwise undergo a transition to a more rigid state for binding of the granules. Such a binder may in general comprise a single substance or a mixture of two or more substances. Similarly, the granular adsorbent material could in general comprise granules (i.e. grains or particles) of one or more component materials. Various examples of binders and materials are described for preferred embodiments below.

The steps of evaporating the solvent and curing the binder could be performed separately or together in methods embodying the invention. These steps may involve performance of one or more active processing steps (e.g. heating to a particular temperature or temperatures), or may occur without active treatment, e.g. simply on passage of time at ambient conditions.

While embodiments might be envisaged in which the curable binder solution is produced in the presence of the granular adsorbent material (e.g. by adding the solvent to binder plus granules and agitating to dissolve the binder), the binder is more conveniently dissolved in solution before it is brought together with the granules. In particularly preferred embodiments the curable binder solution is applied to stacked granular adsorbent material. In some methods, the adsorbent material is first stacked on a heat exchanger structure and the curable binder solution is then applied to the adsorbent material. In this way, additional localized bonds are formed around contact points between the heat exchanger structure and granules of the adsorbent material on curing of the binder. The resulting adsorbent structure is thus formed on, and bonded to, the heat exchanger structure to form the adsorption heat exchanger device. In these embodiments, the adsorbent material may be stacked in at least one cavity of the heat exchanger structure for containment of the stack. Such a cavity may be provided, for example, by channels or other regions between fins, lamellae, pins or other projecting formations (where provided) on the adsorption side of the heat exchanger structure or simply by the container formed by a generally flat heat exchanger bed.

Alternative methods embodying the invention include, after curing the binder, breaking the bonded adsorbent material into clusters of bonded granules. These clusters may then be stacked in at least one cavity of a heat exchanger structure as described above. The surface of such a cavity may be pre-coated with a binder for bonding clusters to this surface. However, the clusters need not necessarily be bonded to the heat exchanger surface in these embodiments.

The curable binder used in embodiments of the invention is preferably a binder which shrinks on curing. This shrinkage not only enlarges void spaces between granules, it also draws thermal interfaces closer together and exerts a compressive force upon them, leading to improved heat transfer and enhanced mechanical stability. Particularly preferred embodiments use a binder which shrinks by at least about 3% (linear shrinkage), and ideally by 5% or more, on curing. This results in considerable compressive force being exerted between the adherent surfaces leading to intimate thermal contact after curing. Further improvements in adhesion and heat transfer across thermal interfaces can be achieved where the adsorbent material comprises granules whose surfaces are polar, either inherently or after treatment for surface functionalization, and by similar treatment of the heat exchanger surface to which the adsorbent material is to be bonded to render that surface polar. This will be discussed further below.

An embodiment of a second aspect of the invention provides an adsorption heat exchanger device for a solid sorption refrigeration system. The device comprises:
a heat exchanger structure; and
an adsorbent structure on the heat exchanger structure;
wherein the adsorbent structure comprises granular adsorbent material and a binder forming localized bonds around contact points between granules of the adsorbent material.

In some devices embodying the invention, the adsorbent structure may be bonded by the binder to the heat exchanger structure via additional localized bonds formed around contact points between the heat exchanger structure and granules of the adsorbent material as hereinbefore described. In other devices embodying the invention, the adsorbent structure may comprise discrete clusters of granules, the granules of each cluster being bonded via said localized bonds, stacked in at least one cavity of the heat exchanger structure. Here, while the granules in each cluster are bonded together, the stacked clusters, though contiguous, remain separate and not themselves bonded to one another.

In general, where features are described herein with reference to a method embodying the invention, corresponding features may be provided in a device embodying the invention, and vice versa.

Preferred embodiments of the invention will now be described, by way of example, with reference to the accompanying drawings in which:

FIG. 4 is a further enlargement illustrating localized bonds in the adsorption structure of FIG. 2;

FIGS. 5a to 5c illustrate formation of localized bonds in methods embodying the invention;

Figure 1A:
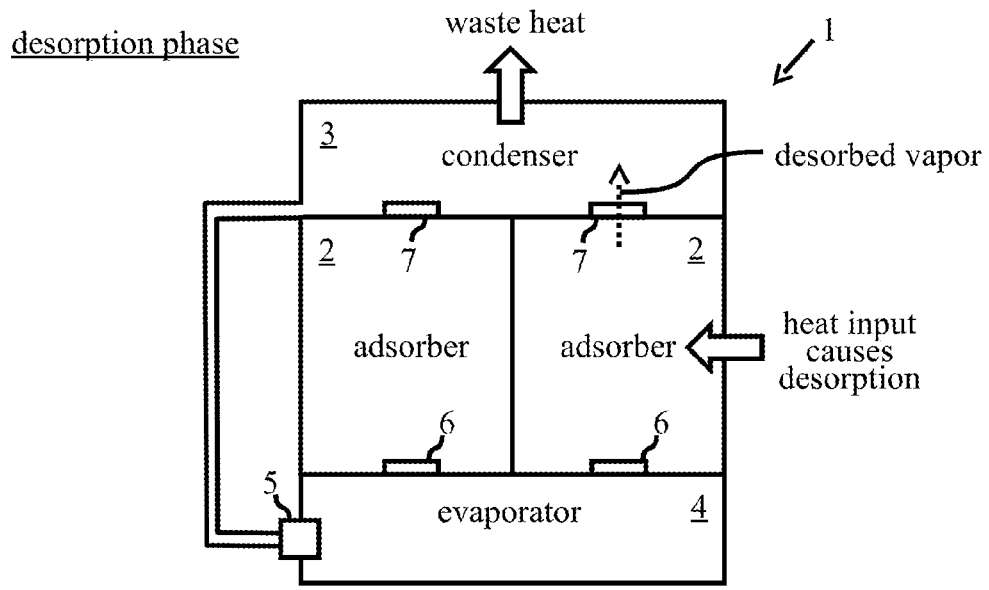
FIGS. 1a and 1b illustrate basic operating phases of a solid sorption refrigeration system.
Figure 1B:
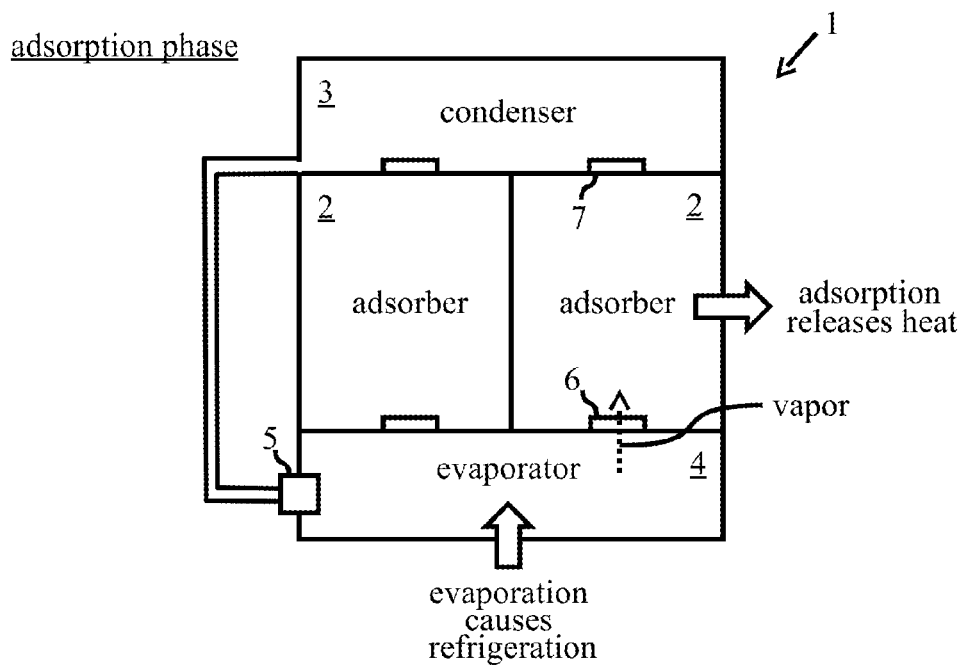

FIGS. 1a and 1b are schematic illustrations of an exemplary solid sorption refrigeration system 1 in which adsorption and heat exchanger devices embodying the invention may be employed. The two figures illustrate the two main phases of the refrigeration cycle, with the solid arrows representing heat flow in each case. This simple system includes two adsorber units 2, a condenser 3 and an evaporator 4. A pipe for passage of condensate from condenser 3 to evaporator 4 terminates in a control device 5, here an expansion valve. The adsorber units 2 are connected to evaporator 4 and condenser 3 via one-way valves 6, 7 as indicated in the figure.

Each unit 2 of system 1 includes adsorption apparatus comprising a plurality of adsorption/heat exchanger devices to be described in detail below. The adsorption/heat exchanger devices are arranged in each unit such that refrigerant vapor, received from the evaporator 4 via valve 6 during the adsorption phase, passes into an adsorption region where it flows over the adsorbent structures of the devices. The vapor is channeled via these structures toward condenser 3 during desorption, escaping from the unit via valve 7 during this phase. During these processes, a heat transfer fluid (HTF), usually water-based, flows over the heat exchanger structures of the devices and is channeled by these structures between fluid inlets and outlets (not shown in the figures) of unit 2. Three reservoirs (not shown) at different temperatures are employed for operation of the system 1: a high temperature ("hot") reservoir, a low temperature ("chilled") reservoir, and an intermediate temperature ("cold") reservoir as discussed further below. In practice, each reservoir may be connected to the system in Figures 1a and 1b by separate HTF loops. The particular mechanisms via which the refrigerant and HTF are delivered to and from the adsorption/heat exchanger devices in each adsorption unit 2 will depend on the precise form and arrangement of these devices. Such mechanisms are well known in the field of adsorption systems and suitable mechanisms for a given arrangement will be readily apparent to those skilled in the art.

The basic operating cycle is illustrated in the figures for the right-hand adsorber unit 2. FIG. 1a illustrates the desorption phase of the cycle. At the start of this phase, the refrigerant fluid (e.g. water or methanol) is fully adsorbed within adsorber unit 2. The adsorber unit is then heated by supplying hot HTF to the unit. Heat is thus transferred via the heat exchangers to the adsorbent structures, causing evaporation and hence desorption of the refrigerant. The refrigerant vapor passes via valve 7 to condenser 3 where the vapor condenses under the high pressure resulting from the desorption process. Heat is rejected to the environment during this process and transferred to cold HTF. The adsorption phase commences when condensation is complete. The liquid refrigerant is passed though expansion valve 5 into evaporator 4 causing partial vaporization. As shown in FIG. 1b, the reduced pressure in evaporator 4 results in further evaporation of refrigerant, drawing heat from the environment during this process and thus causing environmental cooling and a low temperature of chilled HTF. Refrigerant vapor passes via valve 6 to adsorber unit 2 and is re-adsorbed, reducing system pressure and promoting further vaporization. Heat rejected by the refrigerant during adsorption is transferred via the heat exchangers in unit 2 to cold HTF at the intermediate temperature. The adsorption phase continues until the refrigerant is fully adsorbed, and the cycle is then complete.

To obtain more continuous cooling, the left-hand adsorber unit in system 1 can be driven in antiphase with the right-hand unit so that adsorption in one unit occurs concurrently with desorption in the other unit. Indeed, while two adsorber units are provided in the simple system shown, in practice systems may use multiple units, operating with appropriate phase shifts, to produce more efficient and continuous cooling.

Figure 2:
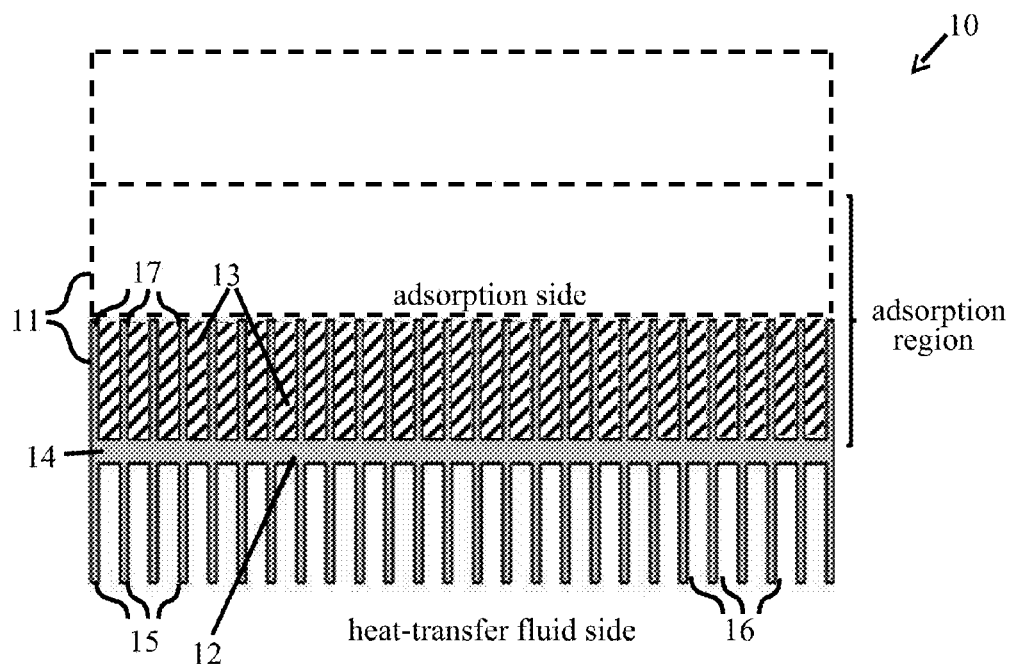
FIG. 2 is a schematic illustration of adsorber apparatus employing an adsorption heat exchanger device embodying the invention.

FIG. 2 illustrates adsorber apparatus embodying the invention for use in adsorber units 2 of system 1. The adsorber apparatus 10 comprises a pair of substantially identical adsorption heat exchanger devices 11, one of which is indicated for simplicity by the broken lines in the figure. The basic structure of the adsorption heat exchanger devices 11 is indicated by the schematic cross-sectional view of the lower device shown in the figure. The device 11 consists of a heat exchanger structure 12 which has an adsorbent structure 13 (indicated by hatching in the figure) formed on one side thereof. In this example, the heat exchanger 12 is in the form of a metal plate 14 which has a series of high aspect ratio fins on both surfaces thereof. The fins 15 on the lower side of plate 14 in the figure define channels 16 for conveying heat-transfer fluid (HTF) in operation. The fins 17 on the opposite, adsorption side of plate 14 provide support for the adsorbent structure 13. In particular, the channels between fins 17 define cavities containing the adsorbent material as described in more detail below. The two devices 11 are arranged with their adsorption sides facing one another whereby the region between the plates 14 defines the adsorption region for passage of the adsorbate vapor in use. The fins 17 on the adsorption side have a high-aspect ratio, preferably about 20:1 or even higher, with the fins 15 on the HTF side being similarly formed in this example.

Figure 3:
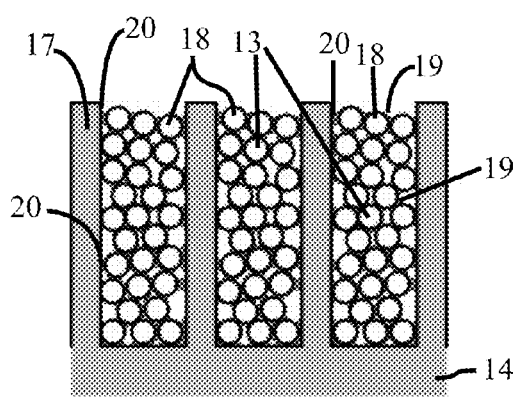
FIG. 3 is an enlarged view of part of the adsorption structure in the device of FIG. 2.

The adsorbent structure 13 of device 11 is illustrated schematically in the enlarged view of FIG. 3. This structure is formed of granular adsorbent material the granules 18 of which are bound together via localized bonds 19 produced by a method detailed below. (Note that, while granule size in relation to fin spacing in the figure is representative for this particular example, different ratios between granule size and fin spacing may be employed in other embodiments. Granule size may, for example, be of the order of half the fin spacing in order to reduce the number of granule-granule contacts in the device.) Those granules 18 contiguous with surfaces of the heat exchanger fins 17 are bonded to these surfaces via additional localized bonds 20 produced by the method to be described. The localized bonds 19, 20 are illustrated more clearly in the enlarged detail of FIG. 4. These bonds 19, 20 are formed of a cured binder substance which is localized in the regions around the contact points between granules (bonds 19) and the contact points between granules and the heat exchanger surface (bonds 20).

The main steps involved in manufacture of adsorption heat exchanger device 11 are as follows. The heat exchanger 12 can be formed in generally known manner from any convenient material with high thermal conductivity, e.g. a metal such as aluminum or copper. The high aspect ratio fins 15, 17 of this embodiment can be produced, for example, by LIGA (lithography, electroplating and molding) or related processes. Other technologies for the production of high aspect ratio heat exchanger structures include cutting (skiving) of metals, milling, electro-discharge or ultrasonic/waterjet cutting. Moreover, heat exchangers may be realized by the application of plates or lamellae onto tubes which convey the heat-transfer fluid, as is well-known in the field of solid-sorption cooling.

After making the basic heat exchanger structure 12, the adsorbent structure 13 is formed on the adsorption side of the heat exchanger. The adsorbent structure 13 can in general be made using any desired granular adsorbent material, and particular examples will be given below. The granular adsorbent is first stacked on the heat exchanger 12 in the manner of a conventional loosely-packed adsorbent powder bed so that granules make point-like contacts with each other and with the supporting surface of the heat-exchanger. In this example, the granular material is stacked in the cavities formed by the channels between heat exchanger fins 17 as illustrated in FIG. 3. A highly-diluted solution of a curable binder is then introduced into the channels and thence to the dense particle beds formed by the stacked granules. The degree of dilution required for this solution is explained in detail below. A variety of binders and solvents can be used for the solution and a number of examples will be given hereinafter. In this preferred embodiment, however, the binder used in the solution is a curable adhesive mixture which is a good thermal conductor and which undergoes significant shrinkage, ideally by about 5% or more (linear shrinkage) on curing.

Application of the binder solution to the stacked granular material leads to wetting of the external surfaces of the granules 18 and heat exchanger fins 17. This is followed by evaporation of the solvent in the binder solution. While the evaporation process could simply be allowed to occur under ambient conditions, faster evaporation can be achieved by active heating to a temperature above room temperature. Higher temperatures could be obtained here by heating of the heat exchanger structure, e.g. via a heat-transfer fluid supplied to channels 16 in this example. Alternatively, and more preferably in this embodiment, ambient heating, for example in a convection oven, can be employed to promote evaporation.

Due to the highly-dilute nature of the adhesive solution, evaporation of the solvent begins the process of forming the localized bonds 19, 20 described above. In particular, as evaporation proceeds, the solution will tend to accumulate in configurations with a concave meniscus, which is the case at the contact points between adsorbent granules and between granules and the heat exchanger surface, leading to an enrichment of adhesive within these regions. Successive stages in the bond-formation process are illustrated schematically in FIGS. 5*a* to 5*c*. FIGS. 5*a* and 5*b* show how stabilization of the concave meniscus of the solvent by surface tension causes the adhesive to become increasingly concentrated around the contact points between granules. FIG. 5*a* shows this process at an early stage with dilute adhesive solution constrained by surface tension to the region between granules. FIG. 5*b* shows the result after complete evaporation of the solvent. The remaining adhesive exhibits a high viscosity and is localized near the contact points. The adhesive is then cured, e.g. by heat treatment as described earlier, whereby the adhesive is fully immobilized as a consequence of cross-linking induced by the curing process. The shrinking of the adhesive during curing further constricts the bond around the contact point and reduces the distance between granules. The result of the curing process is illustrated in FIG. 5*c*. A mechanically rigid, thermally conducting adhesive bond 19 is obtained which is localized around the contact point between granules 18. The adhesive bonds 20 are formed in the same manner at contact points between granules and the heat exchanger surface.

As a result of the above process, a tightly interconnected adsorbent network is obtained. Application of the adhesive in highly-dilute form avoids coating of the entire granule surface with the adhesive, which would act as a barrier toward vapor transfer to the outer and inner granule surface. Through formation of the localized bonds, the adhesive is substantially confined to the regions between contiguous granules adjacent the contact points thereof (and similarly at the contact points between granules and heat exchanger). These localized bonds provide strong mechanical binding of the adsorption structure yet leave sufficient void space between adsorbent particles to allow facile mass transfer (i.e. vapor transport) through the structure in use. Moreover, the localized bonds effectively expand the thermal interfaces between granules offering improved thermal transport in the bonded structure. In addition, shrinkage of the binder on curing draws thermal interfaces closer together, exerting a compressive force upon them, leading to improved heat transfer as well as enhanced mechanical stability.

Figure 6A:
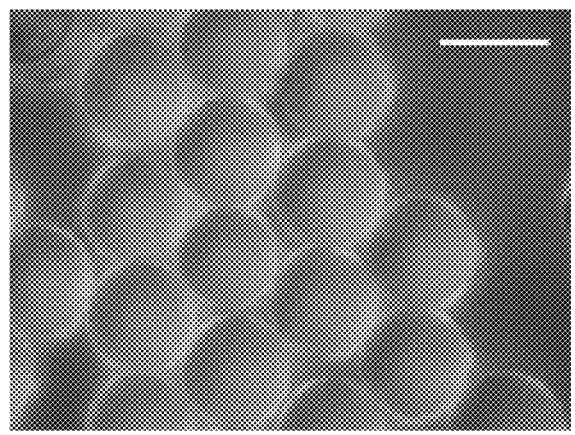
FIGS. 6a to 6c illustrate results of applying different binder solutions to adsorbent granules.
Figure 6B:
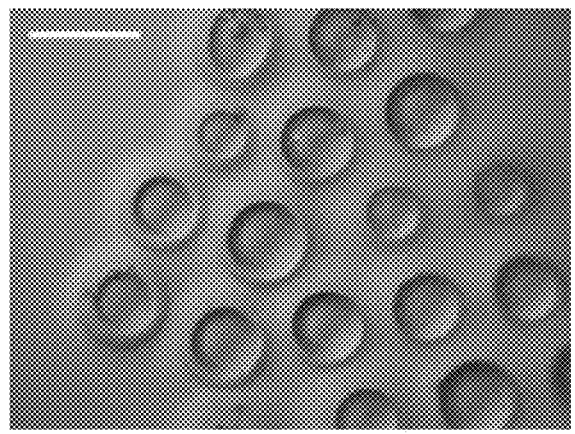
Figure 6C:
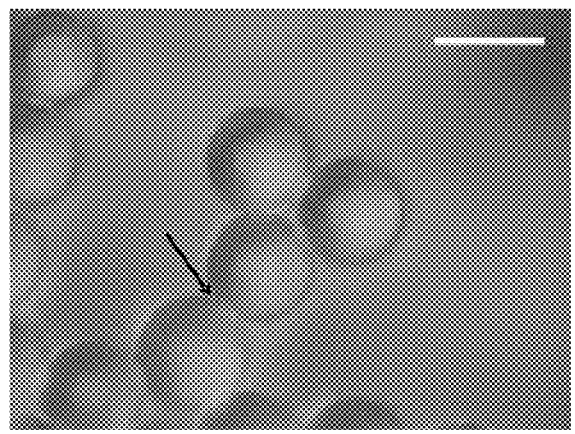

The binder solution used in the foregoing process must be sufficiently dilute to permit formation of the localized bonds on evaporation and curing due to concentration of the binder around contact points as described above. If the solution is too concentrated, localized bonds will not be formed and the granules will be effectively bound in an adhesive matrix which inhibits efficient vapor transport. By way of illustration, FIGS. 6*a* to 6*c* show the results of applying different adhesive loadings to model particles (here soda lime spheres) on a flat surface. The adhesive used was a mixture of epoxy resin and hardener (Epo-Tek 302-3M (Epo-Tek is a registered trade mark of Epoxy Technology Inc.)) in a ratio of 100:45 by mass. FIG. 6*a* shows the result obtained using simply an acetone wash without adhesive. FIG. 6*b* shows the result obtained on application of 1:1 adhesive:acetone solution at 65° C. for 3 hours. Here the particles are essentially embedded in the adhesive matrix leading to poor vapor transport to both external and internal particle surfaces. In contrast, FIG. 6*c* shows the result obtained on application of 1:150 adhesive:acetone solution at 65° C. for 3 hours. At such a highly-dilute adhesive concentration the local formation of adhesive bonds is achieved at the particle contact points. The arrow in FIG. 6*c* indicates a localized adhesive bond obtained in this case.

It will be appreciated of course that the appropriate degree of dilution and the limits thereof for achieving formation of localized bonds as described will depend on the particular binder and solvent materials used, and suitable solutions will be readily apparent to those skilled in the art from the description herein. The key point is that, for any given formulation, the binder solution is sufficiently dilute to achieve formation of the localized bonds as described. By way of illustration, however, and without limitation to this key functional requirement, solutions containing the binder in a ratio of up to about 1:5 by mass binder:solvent may be suitable depending on the particular formulation employed. Solutions containing the binder in a ratio of up to about 1:25 by mass binder:solvent are more likely to be suitable, again depending on the formulation. Solutions containing the binder in a ratio of up to about 1:50 by mass binder:solvent will often be suitable, while solutions containing the binder in a ratio of up to about 1:100 by mass, e.g. about 1:150, binder:solvent are more typical and preferred.

Figure 7:
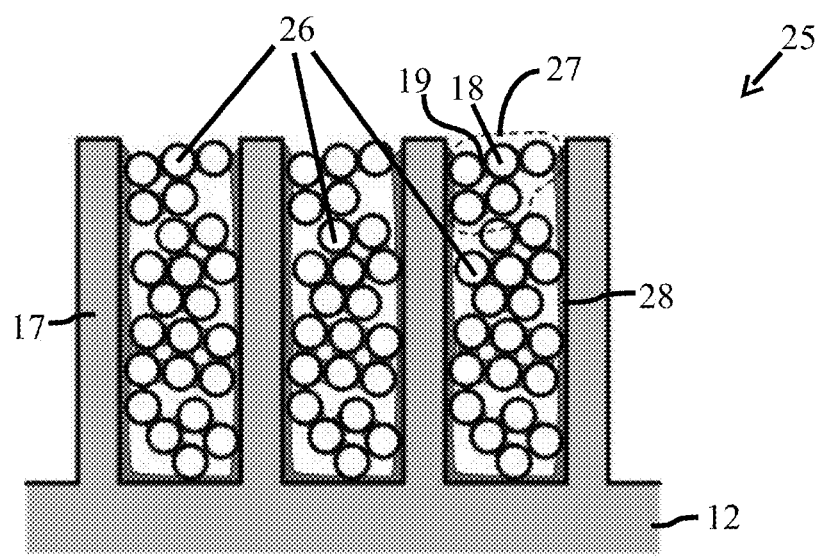
FIG. 7 illustrates the adsorption structure of another adsorption heat exchanger device embodying the invention.

A second adsorption heat exchanger device embodying the invention will now be described with reference to FIG. 7. This is a schematic enlarged view, similar to FIG. 3, of part of the adsorption heat exchanger device 25 of this embodiment. The device 25 is generally similar to device 11 described above and like parts are designated by like reference numerals in FIG. 7. In this embodiment, however, the adsorbent structure 26 comprises discrete clusters 27 of adsorbent granules 18. One such cluster 27 is indicated by the dashed line in the figure. The granules 18 of each cluster 27 are bonded together via localized bonds 19 as described above. In addition, clusters 27 adjacent the heat exchanger surface are bonded to this surface by a thin film of binder 28. The clusters 27 themselves, though contiguous, remain separate and are not bonded to one another.

The device 25 can be produced by first pre-bonding granular adsorbent material by a method generally as described above but outside of the heat exchanger 12, i.e. using an alternative container for the stacked adsorbent. After curing of the binder, the resulting bonded adsorbent material is broken into clusters of bonded granules. The cluster size may be defined, for instance, by breaking down larger agglomerates of bonded granules by mechanical action such as crushing, milling or grinding. The heat exchanger structure is then filled with the adsorbent clusters 27 by stacking the clusters in the cavities formed by the channels between fins 17 in this example. The surfaces of these cavities are pre-coated with a film of curable binder, e.g. an adhesive, which is conveniently the same as that used to form localized bonds 19 in clusters 27. The binder may be applied to the heat exchanger structure in any convenient manner, for example by dip-coating, flooding or spraying. If required to enable practical distribution of the adhesive onto the heat exchanger, a solvent such as acetone may be used to dissolve the adhesive prior to application. Any such solvent can then be evaporated and the binder can be cured, e.g. by heating to an appropriate temperature. The elevated temperature here is preferably obtained by heating of the heat exchanger, for example via a heat-exchanger fluid, but could be via ambient heating if desired. Again, shrinkage of the binder on curing results in drawing together of thermal interfaces, reducing heat flow paths and enhancing thermal transport between the heat exchanger and adsorbent material. Following curing, the binder film 28 ensures rigidity of the adsorbent clusters within the heat exchanger and good heat transfer between heat exchanger and the adsorbent clusters. By virtue of the irregularly shaped clusters, sufficient void space between clusters is made available for efficient transfer of vapor (mass transport). Indeed, compared to the adsorbent structure 13 of device 11 described above, the clusters result in larger voids in adsorbent structure 26 offering improved mass transport in the vapor phase.

It will be seen that the adsorbent structures 13, 26 of devices 11, 25 described above offer dense adsorbent packing while avoiding the high thermal resistance at the point-like contacts between adsorbent particles in conventional powder beds. Compared to various prior systems discussed earlier, volumetric loading of adsorbent is high, thermal conductivity in the heat exchanger/adsorbent arrangement is high due to shorter heat flow paths and reduced interfacial thermal resistance, and both mechanical adherence and vapor access to adsorbent are good due to formation of the localized bonds. Improvements in the wall heat transfer coefficient between heat exchanger and adsorbent and in the thermal conductivity between adsorbent particles leads to higher specific cooling power (in W/kg) in operation of the cooling system. As a consequence, the embodiments described provide an important pathway for future high-performance solid sorption cooling devices.

It will be appreciated that adsorbent structures embodying the invention can be produced using a variety of materials. The techniques described are highly flexible and can be applied to any granular adsorbent material regardless of type and granule shape. By way of example, the granular adsorbent material may comprise any of those well-known in the field of solid sorption cooling, such as silica gels, clays, zeolites or activated carbons. In particularly preferred embodiments, to enhance interfacial adhesion and improve heat transfer across thermal interfaces, the adsorbent material comprises granules with polar surfaces. That is, there is some charge separation at the level of inter-atomic bonding at these surfaces. Such polar surfaces may be an inherent property of the adsorbent material and/or may be produced by surface functionalization treatment. By way of example, the surface chemistry of the adsorbent may include oxygen-containing functional groups such as —O—, —OH or =O. Such groups are inherently present in the above-mentioned adsorbents, but their surface concentration may be increased by exposing the adsorbents to oxidative conditions, e.g. treatment with oxidizing agents such as $O_2$, $H_2O_2$, $HNO_3$ or $H_2SO_4$, possibly at elevated temperatures. Note that the heat exchanger may also be functionalized by similar treatment to render its surface (specifically the surface to which the adsorbent material is to be bonded) polar, and thereby obtain a good wettability and strong binding with the adhesive.

The curable binder used in embodiments of the invention may in general comprise an adhesive or a fibrous or other substance which can be cured to effect a transition to a more rigid state for binding surfaces. Such a binder may in general comprise a single substance or a mixture of two or more substances. Ideally, the binder will exhibit a large shrinkage as well as strong adhesion to the selected adsorbent. Various suitable binders will be readily apparent to those skilled in the art. Particular examples include polymeric binder materials such as adhesive mixtures comprising a resin (e.g. epoxy resin) and a hardener. Various adhesives such as those used as non-conductive adhesive (NCA) technology in electronic packaging may be employed (see, for example, Teh et al., Thin Solid Films 462 (2004), 446-453). Suitable adhesives may be formed from liquid epoxy resin, e.g. of the bisphenol type, and a hardener, e.g. of the amine variety. Liquid rather than solid epoxy formulations are preferred since the shrinkage of the former upon curing is more significant, i.e. up to 10% during curing of liquid epoxies compared to less than 1% for solid epoxies. The curing temperatures for both systems lie in the range of 90-200° C., whereby the duration of curing will depend on the chosen curing temperature and will typically lie in the range of a few minutes to a few hours. The —OH functionality of the cured epoxies results in strong interfacial binding to the adsorbent particles and heat exchanger.

Alternative adhesive technologies may be used if desired, with the desirable selection criteria including high shrinkage during curing (whereby thermosetting adhesives are preferred over thermoplastic adhesives), and the absence of volatile reaction products during the cross-linking process taking place during curing in order to prevent void formation in the adhesive or disruption of the particle bed. Based on these criteria, the epoxy-based adhesive described above is a preferred technology.

Thermal conductivity of the binder is preferably high to maximize heat transport efficiency. The exemplary adhesives described above are typically good thermal conductors. If desired, however, improved thermal conductivity of the adhesive may be achieved by the addition of granular filler material which is of higher thermal conductivity than the binder itself. Filler particles with high thermal conductivity, such as silver, alumina or carbon, may be used for this purpose. However, the addition of filler material impairs the high shrinkage capability of the resin. Generally, the preferred conditions for high adhesive shrinkage are: small monomer size of the resin; absence of filler particles in the resin; high degree of curing at low curing temperature. The last condition is based on the knowledge that a high cross-linking density leads to the highest polymer density and that lower temperatures result in the least thermal expansion of the polymer. Where filler particles are used, these can be added to the binder in the liquid state, e.g. to liquid binder prior to dissolving in solvent or to the resulting solution. In general, any convenient solvent can be used to form the dilute binder solution used in the above embodiments. Particular examples here are acetone and isopropyl alcohol.

Many changes and modifications can of course be made to the exemplary embodiments described above. For example, while a coating of binder 28 is employed to bond clusters to the heat exchanger in FIG. 7, the clusters need not necessarily be bonded to the heat exchanger surface in such embodiments. Also, the steps of evaporating the solvent and curing the binder may in general be performed separately or at least partially simultaneously in methods embodying the invention. These steps may involve performance of one or more active processing steps (e.g. heating to a particular temperature or temperatures), or may occur at ambient conditions without active treatment.

Adsorption heat exchanger devices embodying the invention can be formed with a variety of overall shapes other than the generally plate-like structures described above. For example, the basic heat exchanger structure could be folded, bent or otherwise shaped in some fashion and/or formed into a closed structure such as a pipe with a cylindrical, hexagonal or other desired cross-sectional shape to contain and channel HTF if desired. The heat exchanger structure need not of course be symmetrical on the HTF and adsorbent sides. Fin height may differ, for example, or fins may be omitted on the HTF side or replaced by some other surface formation. While the heat exchanger preferably has some form of projecting surface formations to increase surface area on the adsorption side, such formations could be other than fins, e.g. pins, lamellae, bends, folds, etc. In some embodiments heat transfer between the environment and heat exchanger structure could occur by direct irradiation or convection rather than via HTF, and the heat exchanger structure could be adapted accordingly. Heat may, for instance, be supplied by solar irradiation. In this case, the heat exchanger structure of the integrated device could serve as the external housing of the adsorption apparatus. Numerous other constructions can be envisaged and, in general, adsorber apparatus embodying the invention could comprise one or more adsorption/heat exchanger devices in any convenient arrangement according to basic shape and design.

It will be appreciated that many other changes and modifications can be made to the exemplary embodiments described without departing from the scope of the invention.

The invention claimed is:

1. A method for making an adsorbent structure for an adsorption heat exchanger device, the method comprising:
  applying a curable binder solution that is in a solvent, to a granular adsorbent material having granules with polar surfaces, wherein there is a charge separation at a level of inter-atomic bonding at the surfaces of the granules;
  exposing the granular adsorbent material to oxidative conditions to increase concentrations of oxygen-containing functional groups on a surface of the granular adsorbent material, wherein said exposing of the granular adsorbent material to oxidative conditions includes treating the granular adsorbent material with one of O2, H2O2, HNO3, and H2SO4, and wherein the oxygen-containing functional groups include one of —O—, —OH and =O;
  evaporating the solvent;
  curing a binder, wherein the binder is in the curable binder solution;
  wherein the curable binder solution is diluted so that during the evaporating of the solvent the binder becomes concentrated around contact points between the granules of the granular adsorbent material; and
  wherein localized bonds are formed around the contact points upon curing of the curable binder; and
  treating a heat exchanger surface to which a granular adsorbent material is to be bonded to render the heat exchanger surface polar.

2. The method according to claim 1, further comprising: applying the curable binder solution to the granular adsorbent material.

3. The method as claimed in claim 2, further comprising:
  stacking the granular adsorbent material on a heat exchanger structure; and
  applying the curable binder solution to the adsorbent material, wherein additional localized bonds are formed around the contact points between the heat exchanger structure and the granules of the granular adsorbent material upon curing of the binder.

4. The method as claimed in claim 1, further comprising:
  stacking the adsorbent material in at least one cavity of the heat exchanger structure.

5. The method as claimed in claim 1, wherein the curable binder solution contains the binder in a ratio by mass of 1:5 from binder to solvent.

6. The method according to claim 1, wherein the binder shrinks upon curing the binder.

7. The method as claimed in claim 6, wherein the curable binder shrinks by at least 3% upon curing the binder.

8. The method as claimed in claim 3, wherein said treating the heat exchanger surface to which the granular adsorbent material is to be bonded to render the heat exchanger surface polar is performed prior to said bonding with the granular adsorbent material.

9. The method as claimed in claim 1, wherein the curable binder comprises an adhesive mixture.

10. A method for making an adsorbent structure for an adsorption heat exchanger device, the method comprising:
  applying a curable binder solution that is in a solvent, to a granular adsorbent material having granules with polar surfaces, wherein there is a charge separation at a level of inter-atomic bonding at the surfaces of the granules;
  exposing the granular adsorbent material to oxidative conditions to increase concentrations of oxygen-containing functional groups on a surface of the granular adsorbent material, wherein said exposing of the granular adsorbent material to oxidative conditions includes treating the granular adsorbent material with one of O2, H2O2, HNO3, and H2SO4, and wherein the oxygen-containing functional groups include one of —O—, —OH and =O;
  evaporating the solvent;
  curing a binder, wherein the binder is in the curable binder solution;
  wherein the curable binder solution is diluted so that during the evaporating of the solvent the binder becomes concentrated around contact points between granules of the granular adsorbent material; and
  wherein localized bonds are formed around the contact points upon curing of the binder;
  treating a heat exchanger surface to render the heat exchanger surface polar; and
  stacking the granular adsorbent material on the heat exchanger surface.

11. The method according to claim 10, further comprising applying the curable binder solution to the granular adsorbent material, wherein additional localized bonds are formed around the contact points between a heat exchanger structure and the granules of the granular adsorbent material upon curing of the binder.

12. The method according to claim 11, further comprising stacking the granular adsorbent material in at least one cavity of the heat exchanger structure.

13. The method according to claim 10, wherein the curable binder solution contains the binder in a ratio by mass of 1:5 from binder to solvent.

14. The method according to claim 10, wherein the binder shrinks upon curing the binder.

15. The method according to claim 10, wherein the curable binder shrinks by at least 3% upon curing the binder.

16. The method according to claim 10, wherein said treating the heat exchanger surface to which the granular adsorbent material is to be bonded to render the heat exchanger surface polar is performed prior to said stacking with the granular adsorbent material.

17. The method according to claim 10, wherein the curable binder solution comprises an adhesive mixture.

18. A method for making an adsorbent structure for an adsorption heat exchanger device, the method comprising:
   applying a curable binder solution that is in a solvent, to a granular adsorbent material having granules with polar surfaces, wherein there is a charge separation at a level of inter-atomic bonding at the surfaces of the granules, wherein the curable binder solution comprises an adhesive mixture;
   exposing the granular adsorbent material to oxidative conditions to increase concentrations of oxygen-containing functional groups on a surface of the granular adsorbent material, wherein said exposing of the granular adsorbent material to oxidative conditions includes treating the granular adsorbent material with one of $O_2$, $H_2O_2$, $HNO_3$, and $H_2SO_4$, and wherein the oxygen-containing functional groups include one of —O—, —OH and =O;
   evaporating the solvent;
   curing a binder, wherein the binder is in the curable binder solution, wherein the binder shrinks upon curing the binder;
   wherein the curable binder solution is diluted so that during the evaporating of the solvent the binder becomes concentrated around contact points between granules of the granular adsorbent material; and
   wherein localized bonds are formed around the contact points upon curing of the binder;
   treating a heat exchanger surface to render the heat exchanger surface polar; and
   stacking the granular adsorbent material on the heat exchanger surface.

* * * * *